United States Patent
Ankeney

[11] Patent Number: 5,248,114
[45] Date of Patent: Sep. 28, 1993

[54] ADAPTIVE AUTOPILOT

[76] Inventor: Dewey P. Ankeney, 301 Midway, China Lake, Calif. 93555

[21] Appl. No.: 481,570

[22] Filed: Jun. 20, 1974

[51] Int. Cl.[5] .................................. F42B 15/01
[52] U.S. Cl. .................... 244/3.15; 244/76 C; 244/191
[58] Field of Search ............ 244/3.15, 3.2, 3.21, 244/3.22; 244/75 R, 76 R, 76 C, 191

[56] References Cited

U.S. PATENT DOCUMENTS

| | | | |
|---|---|---|---|
| 3,188,019 | 6/1965 | Boutin | 244/3.2 |
| 3,362,658 | 1/1968 | Ito et al. | 244/3.2 |
| 3,412,960 | 11/1968 | Kocher et al. | 244/3.15 |
| 3,415,215 | 12/1968 | Martin et al. | 244/3.15 |
| 3,497,161 | 2/1970 | Kissinger et al. | 244/3.2 |
| 3,737,122 | 6/1973 | Solov | 244/3.21 |

Primary Examiner—Michael J. Carowe

[57] ABSTRACT

An autopilot system including parameter identification circuits wherein the function of the torque and the function of the translational force on a missile are unknown and varying (including approaching zero).

6 Claims, 1 Drawing Sheet

ADAPTIVE AUTOPILOT

BACKGROUND OF THE INVENTION

In the field of missile guidance systems, previous autopilots are designed to function properly when the torque and the translational forces on the craft are constants. During the flight of a missile or other craft, aerodynamic forces will be present. As long as the environmental parameters and direction of flight remain unchanged the forces will be nominally constant. If the autopilot, however, operates to change the direction of flight, or the environmental parameters change, such as by varying the crafts altitude, the aerodynamic forces will be altered.

If these forces vary in a predicable manner or to a known degree, additional circuity may be including within the autopilot to compensate for these variations. For example, the variations of the aerodynamic forces caused by the crafts change of altitude are compensated for in at least one prior autopilot by a switching circuit to automatically vary the autopilot's electronic gain in response to the change in altitude.

If the autopilot, however, operates to change the direction of flight, or the environmental parameters change, in an unpredictable or unknown fashion, the alteration causes M and N to be unpredictable and unknown variables, wherein M is an unknown function of the torque on the craft, and N is an unknown function of the translational force on the craft. In such a case, M and N are extremely difficult to measure, and therefore, cannot be compensated for by employing a switching system to vary the gain, or by employing any of the other presently used compensation systems. As a result, in these situations, or when the forces inherently applied to the craft during its flight approach zero, all previous autopilots saturate or otherwise malfunction.

M is defined as the pitch acceleration coefficient in rad/sec², and is defined by $$M = (1/J)(C_{N\alpha} qsL\alpha + TL_t\delta) = \theta$$

wherein:
- J = Polar moment of inertia in pitch (slug-ft²)
- $C_{N\alpha} = f(M).f(\alpha)$ = Linearized body force coefficient (per degree)
- q = ½ ev² = Aerodynamic pressure (lb/ft²)
- s = Missile reference area (ft²)
- L = f(t) + f(M).f(α) = Distance between C.P. and C.G. (ft)
- T = f(t) = Rocket motor total thrust (lb)
- $L_t$ = f(t) = Distance between tail force application point and C.G. (ft).
- θ = pitch angular acceleration (rad/sec²)
- α = angle of attack (degrees)
- δ = nozzle deflection (degrees)

N is the missile cross-body acceleration coefficient in ft/sec², and is defined by $$N = (1/m)(C_{N\alpha}qs\alpha + T\delta - C_x\cos^2\alpha qs) = y$$

wherein:
- m = f(t) = Missile mass (slugs)
- $C_{N\alpha}$ = Linearized aerodynamic body normal force coefficient (per degree)
- q = ½ pv² = Aerodynamic pressure (lb/ft²)
- s = Missile reference area (ft²)
- T = f(t) = Rocket motor total thrust (lb)
- $C_x = f(M).f(\alpha)$ = Aerodynamic axial force coefficient
- α = missile angle of attack (degrees)
- y = translational acceleration (ft/sec²)
- δ = nozzle deflection (degrees)

The present invention is an adaptive autopilot wherein the value of the variable parameters M and N are identified by a parameter identification circuit and continuously updated throughout the flight, although they are not directly measured. The identified variable parameters are then compensated for by the present invention. As a result, flight stability is maintained even when the craft performs extraordinary gymnastics.

BRIEF DESCRIPTION OF THE DRAWING

The FIGURE is a schematic diagram of the preferred embodiment of the present invention showing the parameter identifications circuits.

DESCRIPTION OF THE PREFERRED EMBODIMENT

Figure 1:
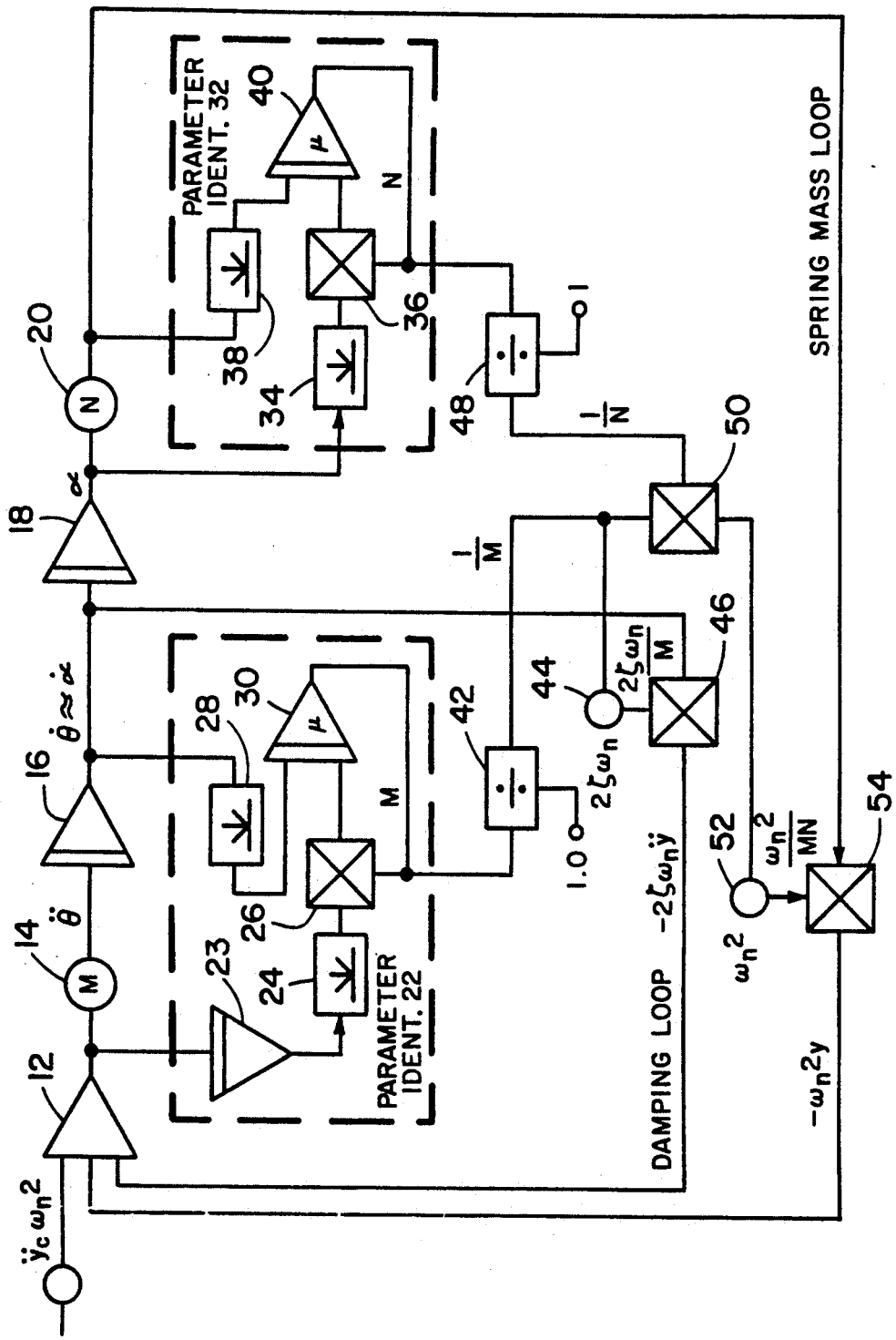

The FIGURE shows the preferred embodiment of the present invention, wherein $y_c$ is an acceleration term commanded by the crafts guidance system, and y is the acceleration term actually achieved by the craft. Basically, the autopilot includes first and second feedback loops, and M and N parameter identification circuits.

Commanded acceleration $y_c$ is coupled to summing amplifier 12 which combines a commanded acceleration with the first and second feedback circuits. The output of amplifier 12 includes parameter M as shown by 14, and is coupled through first and second integrators 16 and 18. The output of integrator 18 includes parameter N as shown by symbol 20.

Parameter identification circuit 22, identifies parameter M by coupling the integrated (integrator 23), absolute value (block 24) of the output of amplifier 12 to multiplier 24 where it is multiplied by the output of the feedback circuit in the form of parameter M. The output of multiplier 26 is coupled to integrating amplifier 30 where it is combined with the absolute value (block 28) of the output of integrator 16. The output of integrating amplifier 30 is the parameter M.

Parameter identification circuit 32 identifies parameter N in a like manner by multiplying the absolute value (block 34) of the output of integrator 18 by a feedback signal in the form of parameter N in multiplier 36. The output of the multiplier is combined with the absolute value of y in integrating amplifier 40. The output of integrating amplifier 40 is the parameter N.

The parameter M is inverted in dividing network 42, and multiplied by $2\zeta\omega_n$, the natural angular frequency damping factor, to form $2\zeta\omega_n/M$. The damping factor is combined with the output of integrator 16 by multiplier 46, and the combination is fedback to amplifier 12 to complete the damping loop.

The parameter N is inverted by divider network 48, and combined with 1/M in multiplier 50. The output of multiplier 50, 1/MN, is modified by the square of the natural angular frequency, $\omega_n^2$, to form $\omega_n^2/MN$. Multiplier 54 combines y and $\omega_n^2/MN$, and feeds its output back to amplifier 12 to complete the spring mass loop. The feedback loop is termed a "spring" loop because the system responds to a step input at y like a critically damped spring mass system.

The present invention operates as follows:

The acceleration signal $y_c$ is commanded by, and received from, the craft's guidance system, and has a magnitude, or total sum, partially dependent on the aerodynamic forces described by the unpredictable and unknown parameters M and N. For most, if not all, applications the signal will be a pulse, or a series of pulses.

It should be noted that in a missile having a tracker, the tracker is gimballed for rotation about at least two axis. Although an autopilot system may be employed for each axis, it has been found that satisfactory tracking occurs when only one system is applied, if it is applied to the axis of maximum motion.

The present invention identifies the unpredictable and unknown parameters created by $y_c$, although they are not directly measured, and compensates for them by dividing them from the signal to obtain the actual, achieved acceleration, y.

Upon a command yc, which is different from the feedback term $-y$, a moment is created which causes an angular acceleration $\theta = M(y_c - y)$. This angular acceleration creates an angle of attack $\alpha$ (represented by the output of integrator 18.) Now a lateral acceleration is created by the angle of attack as represented by $y = N\alpha$. The major feedback is $(-\omega_n^2 y.)$, which is negative feedback. Also a secondary negative feedback loop feeds back $(-2\zeta\omega_n y)$ as a damping term. $\omega_n$ and $\zeta$ are previously chosen fixed values.

Since M and N are usually (although not always) slowly varying; a division circuit using high gain integrators 30 and 40 (high gain is represented by $\mu$) generate, respectively M and N. The identification circuit operates very well in a low signal to noise environment and its response time (time to achieve identification) is proportional to signal level.

The present invention is particularly advantageous over the prior devices when M and N are varying with time, including approaching zero, as occurs in some missile applications or for the applications wherein the autopilot will be operating in the presence of noise and/or low signal levels.

What is claimed is:

1. An autopilot that automatically adapts to the aerodynamic forces on a craft whether the forces are nominally constant or varying, or approaching zero, comprising:

means generating an angular acceleration in the craft in response to an acceleration command such that the angular acceleration is defined by $\theta = M(y_c - y)$, wherein $y_c$ is the commanded acceleration, y is the lateral acceleration attained, and M is the pitch acceleration coefficient;

means generating a lateral acceleration in the craft in the craft in response to said acceleration command such that the lateral acceleration is defined by $y = N\alpha$, wherein $\alpha$ is the craft's angle of attack, and N is the craft's cross-body acceleration coefficient;

means for automatically evaluating M and N, and continuously updating said evaluation as said forces vary;

means for dividing M and N from said acceleration command to compensate for the effect of said forces and provide the lateral acceleration preselected for the craft.

2. The autopilot of claim 1 wherein, said acceleration command is an electrical signal coupled to a first signal combining means;

first and second serially connected integrators are coupled to the output of said signal combining means;

a first parameter identification circuit is coupled to the output of said first signal combining means and the output of said first integrator, and provides M as an output;

a second parameter identification circuit is coupled to the output of said second integrator, and provides N as an output;

a first feedback loop to the input of said first signal combining means is coupled to said M output and the output of said first integrator; and a second feedback loop to the input of said first signal combining means is coupled to said N output, said M output, and the output of said second integrator;

wherein the attained lateral acceleration is the value of the output of said second integrator.

3. The autopilot of claim 2 wherein said first feedback loop includes means for inverting the output M to 1/M and adding the factor $2\zeta\omega_n$, wherein $\omega_n$ is an undamped natural frequency of the system and $\zeta$ is a preselected damping ratio, and combining the result with the output of said first integrator such that the signal fed back to said first signal combining means is $-2\zeta\omega_n y$.

4. The autopilot of claim 3 wherein said second feedback loop includes means for inverting the outputs N to 1/N and M to 1/M, and adding the factor $\omega_n^2$, and combining the result with the output of the second integrator such that the signal fed back to said signal combining means is $-\omega_n^2 y$.

5. The autopilot of claim 4 wherein said means for automatically evaluating M and N includes an identification circuit for identifying M, comprising a third integrator coupled to the output of said first signal combining means, and a first high gain integrator coupled to the absolute value of the output of said first integrator and the combination of the absolute value of the output of said third integrator and M, wherein the output of said first high gain integrator is M.

6. The autopilot of claim 5 wherein said means for automatically evaluating M and N further includes an identification circuit for identifying N, comprising a second high gain integrator coupled to the absolute value of the output of said second integrator and the combination of the absolute value of the output of the second integrator and N, wherein the output of said second high gain integrator is N.

* * * * *